US008786619B2

(12) United States Patent
Marketsmueller

(10) Patent No.: US 8,786,619 B2
(45) Date of Patent: Jul. 22, 2014

(54) PARALLELIZED DEFINITION AND DISPLAY OF CONTENT IN A SCRIPTING ENVIRONMENT

(75) Inventor: Sebastian Marketsmueller, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 408 days.

(21) Appl. No.: 13/035,601

(22) Filed: Feb. 25, 2011

(65) Prior Publication Data

US 2012/0218278 A1  Aug. 30, 2012

(51) Int. Cl.
*G06T 1/00* (2006.01)
*G06F 9/38* (2006.01)
*G06F 13/14* (2006.01)

(52) U.S. Cl.
CPC . *G06F 9/38* (2013.01); *G06F 13/14* (2013.01)
USPC ........................................................ 345/522

(58) Field of Classification Search
None
See application file for complete search history.

(56) References Cited

U.S. PATENT DOCUMENTS

| 7,626,591 | B2 * | 12/2009 | Crawfis et al. | 345/587 |
|---|---|---|---|---|
| 7,711,990 | B1 * | 5/2010 | Nickolls et al. | 714/37 |
| 7,768,515 | B1 * | 8/2010 | Eitzmann et al. | 345/501 |
| 7,773,090 | B1 * | 8/2010 | Diard et al. | 345/522 |
| 7,777,749 | B2 | 8/2010 | Chung et al. | |
| 7,796,129 | B2 | 9/2010 | Bakalash et al. | |
| 7,796,130 | B2 | 9/2010 | Bakalash et al. | |
| 7,800,610 | B2 | 9/2010 | Bakalash et al. | |
| 7,800,611 | B2 | 9/2010 | Bakalash et al. | |
| 7,800,619 | B2 | 9/2010 | Bakalash et al. | |
| 7,808,499 | B2 | 10/2010 | Bakalash et al. | |
| 7,808,503 | B2 | 10/2010 | Duluk, Jr. et al. | |
| 7,808,504 | B2 | 10/2010 | Bakalash et al. | |
| 7,812,844 | B2 | 10/2010 | Bakalash et al. | |
| 7,812,845 | B2 | 10/2010 | Bakalash et al. | |
| 7,830,389 | B2 | 11/2010 | Maass et al. | |
| 7,843,457 | B2 | 11/2010 | Bakalash et al. | |
| 8,001,531 | B1 * | 8/2011 | Rideout et al. | 717/124 |
| 2003/0123089 | A1 * | 7/2003 | Doyle | 358/1.18 |
| 2004/0141399 | A1 * | 7/2004 | Sohn et al. | 365/230.03 |
| 2004/0160450 | A1 * | 8/2004 | Doyle | 345/552 |
| 2007/0088792 | A1 * | 4/2007 | Piper et al. | 709/207 |
| 2008/0316216 | A1 * | 12/2008 | Bakalash et al. | 345/505 |

(Continued)

FOREIGN PATENT DOCUMENTS

CN   102707928   10/2012

OTHER PUBLICATIONS

Buck et al. ("Tracking Graphic State for Networked Rendering", HWWS '00 Proceedings of ACM SIGGRAPH/EUROGRAPHICS workshop on Graphics hardware, pp. 87-95, New York, NY 2000).*

(Continued)

*Primary Examiner* — Kee M Tung
*Assistant Examiner* — William Beutel
(74) *Attorney, Agent, or Firm* — Wolfe-SBMC

(57) ABSTRACT

Various content may be defined and display in parallel in a scripting environment. The scripting language may not wait for error checking or reporting before proceeding to updating the content definition. In one embodiment, no error checking or reporting may be performed. Content may be defined by setting graphics states while content may be displayed by validating the graphics states and submitting validated states to a GPU. The defining and display of content may be performed asynchronously.

21 Claims, 5 Drawing Sheets

(56) References Cited

U.S. PATENT DOCUMENTS

| | | | |
|---|---|---|---|
| 2009/0128551 A1* | 5/2009 | Bakalash et al. | 345/419 |
| 2011/0055815 A1* | 3/2011 | Squillace | 717/125 |
| 2011/0157196 A1* | 6/2011 | Nave et al. | 345/522 |
| 2012/0117145 A1* | 5/2012 | Clift et al. | 709/203 |
| 2012/0159261 A1* | 6/2012 | Maybee et al. | 714/38.13 |

OTHER PUBLICATIONS

Wikipedia, "Thread (computer science)," downloaded from http://en.wikipedia.org/wiki/Thread_%28computer_science%29 on Oct. 4, 2011, 8 pages.

Wikipedia, "WebGL," downloaded from http://en.wikipedia.org/wiki/WebGL on Oct. 4, 2011, 6 pages.

MDN, "WebGL," downloaded from https://developer.mozilla.org/en/WebGL on Oct. 4, 2011, 3 pages.

"Xserver—X Window System display server," downloaded from http://www.x.org/archive/X11R6.8.1/doc/Xserver.1.html on Oct. 4, 2011, 12 pages.

OpenGI, "The Industry's Foundation for High Performance Graphics," downloaded from http://www.opengl.org/resources/bindings/ on Oct. 4, 2011, 3 pages.

* cited by examiner

PARALLELIZED DEFINITION AND DISPLAY OF CONTENT IN A SCRIPTING ENVIRONMENT

TECHNICAL FIELD

This disclosure relates generally to graphics interfaces, and more specifically, to graphics application programming interfaces (APIs).

BACKGROUND

Description of the Related Art

The interface between a central processing unit (CPU) and an attached graphics processing unit (GPU) is traditionally managed using a client-server architecture. Actions performed on the client are converted to requests on the GPU server. Consequently, server requests may cause a return of information to the client. For such requests, synchronous APIs in the client must block further requests until results are available from the server. In turn, the server also spends a significant amount of time idle waiting for subsequent client actions.

SUMMARY

This disclosure describes techniques and structures that facilitate parallelized definition and display of content in a scripting environment. In one embodiment, a graphics state may be set. A task corresponding to the set graphics state may be submitted to a GPU. Without waiting for indication of successful completion of the task by the GPU, another graphics state may be set. In one embodiment, the scripting environment may provide a single-threaded programming model. Before submitting the task, the set graphics state may be validated. If the graphics state fails validation, the task may be skipped and another set graphics state may be read. If the graphics state passes validation, the task and graphics state may be submitted to a GPU to perform the draw task corresponding to the graphics state. In one embodiment, errors may not be checked or reported. Likewise, in one embodiment, validation failure may not be reported; instead, in such an embodiment, the draw task associated with the graphics state that failed to validate may be skipped.

In one embodiment, setting graphics states, validating graphics states, and/or performing draw tasks may be performed in parallel. Thus, subsequent graphics states may be set before a draw task is complete. Graphics states may be set in a buffer, and graphics states may be read, for example, for validation and transfer to the GPU, from the same buffer. The buffer may allow for simultaneous reads and writes. In one embodiment, a debug mode may be selected in which, in serial, a graphics state may be set, a corresponding draw task may be performed, and error checking and reporting may be performed. Accordingly, the debug mode may allow serial and sequential definition and display of content.

Figure 1:
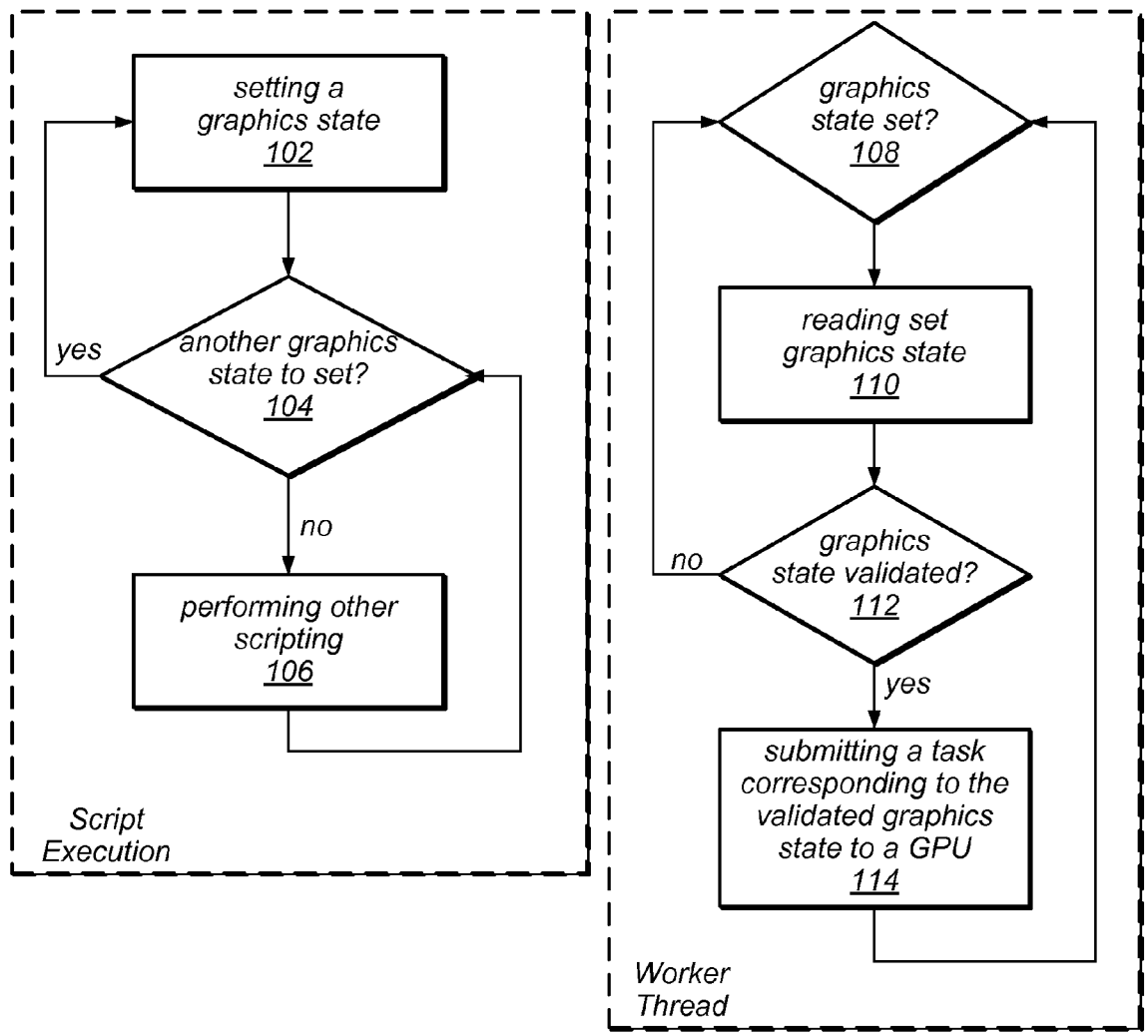
FIG. 1 is a flowchart of parallelized definition and display of content, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, in a graphics API setting graphics states, the terms "first" and "second" graphics states can be used to refer to any two graphics states. In other words, the "first" and "second" graphics states are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Digital image editing applications, executed on a computing device, may be used to manipulate, enhance, transform, create and render images, graphics, and videos, such as vector graphics, 3D graphics, and video. Digital image editing applications may be used to render, modify, and edit such objects, according to various embodiments described herein, and may use an API, such as OpenGL, DirectX, or Direct3D.

Various embodiments of methods and apparatus for parallelized definition and display of content, such as 3D content, in a scripting environment are described. Some embodiments may include a means for parallelized defining and displaying of content. For example, a state setting module may receive user input and set a graphics state in a state block. A drawing module may validate the set graphics state and provide the graphics state to a GPU. The state setting and drawing modules may, in some embodiments, be implemented by program instructions stored in a computer-readable storage medium and executable by one or more processors (e.g., one or more CPUs or GPUs) of a computing apparatus. The computer-readable storage medium may store program instructions executable by the one or more processors to cause the computing apparatus to perform parallelized definition and display of content, as described herein. Other embodiments of the state setting and drawing modules may be at least partially implemented by hardware circuitry and/or firmware stored, for example, in a non-volatile memory.

Turning now to FIG. 1, one embodiment for parallelized definition and display of content is shown. While the blocks are shown in a particular order for ease of understanding, other orders may be used. In some embodiments, the method of FIG. 1 may include additional (or fewer) blocks than shown. FIG. 1 is illustrated as parallel processes that may be performed at the same time. The left box in FIG. 1, blocks 102-106, may correspond to the script execution portion (scripting thread) of the scripting environment. The right box in FIG. 1, blocks 108-114, may correspond to the worker thread of the scripting environment. The two paths are depicted as parallel paths for ease of understanding. The two paths may occur simultaneously, sequentially, or may sometimes occur simultaneously and sometimes occur sequentially. Both paths demonstrate an example ordering and may, in some embodiments, proceed in a different ordering.

At 102, a graphics state may be set. A graphics state may be a definition for a display of content, such as 3D content. For example, in a 3D graphics API, the graphics state may be set to setRenderToTexture( ). The command to set the graphics state may come from a scripting language, (e.g., ActionScript 3, JavaScript, Microsoft .NET scripting languages, etc.), which may provide a single-threaded programming model. Other example graphics states may include: setProgram( ) setProgramConstantsFromVector( ) setProgramConstantsfromMatrix( ) setVertexBufferAt( ) setBlendFactors( ) setColorMask( ) setDepthTest( ) setTextureAt( ) setRenderToTexture( ) setRenderToBackBuffer( ) setCulling( ) setStencilActions( ) setStencilReferenceValue( ) setScissorRectangle( ) etc. In one embodiment, invoking a function that sets a state may perform modifications, such as a write, of a graphics state block and return so that another graphics state may be set (or so that other scripting tasks may be performed). The graphics state block may implement buffer flipping, such as with a circular buffer or ring buffer. A ring buffer of multiple state blocks may allow a write only mode for setting states and a read only for reading states, thereby preventing simultaneous access. In one embodiment, the graphics state block may be implemented as a 64-ring buffer. The size of a buffer, in various implementations, may be based on how fast the script is at setting up new states versus how fast the GPU is at using the states. Setting the graphics state may include writing to one of the blocks/elements of the graphics state block buffer. The graphics state block may, in various embodiments, reside in central processing unit (CPU) system memory such that state changes may be cached in CPU system memory. In doing so, setting the graphics state may not require GPU access. In one embodiment, a graphics state may be set in a debug mode. In the debug mode, the graphics state may be set directly in the GPU by the scripting thread.

In one embodiment, after setting a graphics state, it may be determined if another graphics state is ready to be set at 104. If another graphics state is ready to be set, then that graphics state may be set at 102, without waiting for any results from the GPU (i.e., without waiting for indication of successful completion of the task corresponding to the set graphics state). Setting additional graphics state may include modifying the graphics state block. For example, in an embodiment that uses a ring buffer, the scripting thread may modify an element of the ring buffer that is empty or has already been read, as described in 106. As a result, in a simple example in which two graphics states have been written to the ring buffer and neither has been read, both graphics states may coexist in different elements of the ring buffer. In one embodiment, the scripting may continue without waiting for GPU results and allow for another graphics state to be set. Setting the graphics state in a state block, or ring buffer, may be transparent to the scripting language. If no other graphics states are ready to be set, the scripting thread may perform other scripting tasks at 106.

At 106, the scripting thread may perform other scripting. For example, other tasks or processing for an API, and other non-graphics-rendering tasks may take place. In one embodiment, after setting a graphics state at 102, the scripting thread may perform other scripting. The scripting thread may perform other scripting if no pending graphics states are ready to be set. In one embodiment, the scripting thread may perform a task other than setting a graphics state, if a task is available, before checking for new graphics states to be set. In that manner, if both graphics state setting tasks and other scripting tasks are available for the scripting thread to perform, the scripting thread may alternate between setting graphics state tasks and performing other scripting tasks. In one embodiment, setting graphics states may be a higher priority than other scripting tasks and all available new graphics states may be set before performing other scripting tasks. After performing other scripting, the scripting thread may again check if another graphics state is ready to be set. If another graphics state is ready to be set, the scripting thread may finish its other task, then set the next graphics state. In one embodiment, an indication may be provided to scripting thread that a new graphics state is ready to be set in the buffer so that an actual check or polling may not be required. The scripting thread may again finish any outstanding task and then set the new graphics state at 102. In one embodiment, if no graphics states are ready to be set and the scripting thread has no other scripting tasks to perform, the scripting thread may wait idle at 104.

Simultaneous with the scripting language execution, a worker thread may be performing tasks. At 108, it may be determined if a new graphics state has been set. In one embodiment, a worker thread may read the buffer to see which graphics state(s) are new in the sense that they have not previously been read by the worker thread. Multiple new graphics states may be set in the buffer. For instance, the worker thread may not process and provide the set graphics states to the GPU as fast as the scripting thread may set the graphics states. In these cases, the worker thread may read priority data (e.g., a timestamp or a high priority indication) to determine which state to read first at 110.

In one embodiment, the set graphics state may be read at 110. The read may be asynchronous in that setting a graphics state may not necessarily be directly followed by reading that set graphics state. Other reads may be ahead in the queue or setting the graphics state may be faster than reading and processing the states. As shown in FIG. 1, reading a set graphics state may occur simultaneously with setting graphics states in block 102 and performing other scripting in block 106. Further, blocks 108-114 may also occur simultaneously with blocks 102-106. 108-114 collectively represent a class of calls that may initiate drawing corresponding to a set graphics state, and may be collectively referred to as draw time. In one embodiment, reading a set graphics state may include a thread inspecting the state block and determining that a state is new since the last time the thread inspected the state block. If multiple new graphics states exist in the state block, the thread may read pointers or other priority data (e.g., a timestamp or high priority indication) in the state block to determine which set graphics state should be read first.

Two calls may initiate drawing by passing data from the set and read graphics state into a graphics pipeline: clear( ) drawTriangles( ). The drawing calls may be initiated by the scripting thread but the scripting thread may return to geometry processing tasks while the worker thread picks up the draw task. The draw task may pass all state information, or a modified portion, to the graphics subsystem (GPU) and initiate drawing. In one embodiment, the draw task may make no effort to recover an error state from the graphics subsystem.

As illustrated at 112, the read graphics state may be validated. For instance, situations may exist in which a state block is in an invalid state. In one embodiment, validating the read graphics state may be a read only operation. Validation may occur internally, performed by a thread on the CPU, and scripting may continue during validation. As an example, the read graphics state may be setProgram( ) that may set a shader that needs certain inputs to function properly. The shader program in this example may require three texture inputs. If the state block is incomplete and only has two texture inputs set instead of three, then a draw function corresponding to the set state may not function properly. In such an example, validation may fail. If validation fails, a draw call may not be executed and task submission to the GPU may be skipped. As a result of validation failure, it may be determined if another graphics state is set at block 108. Validation may be performed for security and safety reasons and may not include any status reporting. In one embodiment, no validation failure reporting is performed. In addition, validation may not include error checking and validation failure may not trigger an error notification to the scripting language. If the read graphics state is validated, a draw call may proceed in block 114.

At 114, a task corresponding to the validated graphics state may be submitted to a GPU. In one embodiment, the worker thread may call functions on a graphics library and set the state in the GPU. In response to the draw call, the worker thread may take the vertices that were provided in the draw call and provide those vertices to the GPU. In one embodiment, another worker thread may simultaneously perform 108-114 for another set graphics state and submit a corresponding task to the same or a different GPU. As described in 102-106, multiple graphics states may be queued such that the graphics subsystem may be kept busy. Thus, after the task is submitted to the GPU, the next set graphics state may be read and processed at 108-114.

Allowing for parallel setting of graphics states and processing the set graphics states may provide a set of choices for and implementation of API semantics that may create a fast-path operating mode that may allow non-blocking initiation of GPU drawing. Such an API may be valuable in a scripting environment that may not have direct support of thread control. The method of FIG. 1 may permit an internal worker thread to continue GPU state management while script execution may immediately return to user processing. The script programmer may enjoy the performance benefit of interleaved processing without having to introduce thread control constructs or handle asynchronous events. Further, by performing state validation, security may still be protected in lieu of error checking and reporting.

Figure 2:
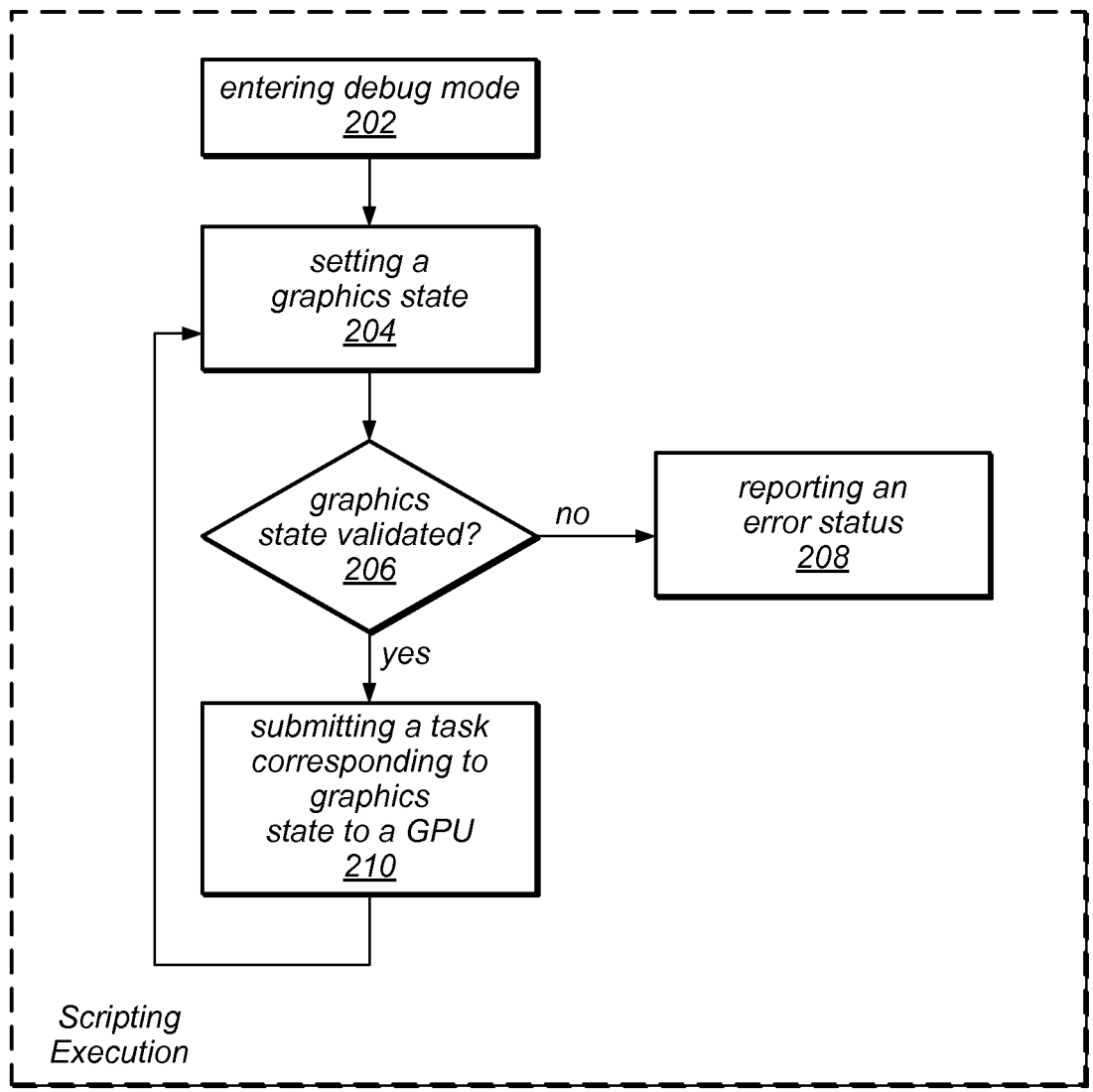
FIG. 2 is a flowchart of a debug mode, according to some embodiments.

Turning now to FIG. 2, one embodiment for a debug mode is shown. While the blocks are shown in a particular order for ease of understanding, other orders may be used. In some embodiments, the method of FIG. 2 may include additional (or fewer) blocks than shown, such as blocks 102-112 of FIG. 1.

At 202, a debug mode may be entered, which may allow synchronous drawing. In one embodiment, debug mode may be selected at draw time at the script level.

As shown at 204, a graphics state may be set. In one embodiment, a graphics mode may be set after entering debug mode while in some embodiments, a graphics mode may already be set when debug mode is entered. In any event, when debug mode is selected, subsequent graphics states may not be set until the GPU returns an error state (which may include a lack of errors). As such, the script may be blocked from further operations.

As illustrated at 206, the set graphics state may be validated. In one embodiment, the graphics state may be validated, as in block 112, before the task is submitted to the GPU. In one embodiment, validation is performed in the scripting language while is some embodiments, validation may be performed at the GPU. Failure to validate the state block may result in an error exception and may trigger an error notification at block 208.

At 208, an error status may be reported. As mentioned at 206, failure to validate the state block may trigger an error notification. In addition, the graphics pipeline may be monitored for errors. In debug mode, state setting and drawing may be performed synchronously such that using sequence IDs to identify an asynchronous task or state may not be necessary. Accordingly, in a synchronous debug mode, rendering may be completed before results are passed back to the client. In other embodiments, a framework for managing message sequence IDs may be introduced to detect and report errors asynchronously. In such an embodiment, a sequence ID may be created for each API call made by the client/scripting language. Each sequence ID may be associated with a respective state block. If an error is determined at the check validation stage, an error may include the id. On the client side, a list of the sequence IDs may map back to the operation that caused the error.

As shown at 210, a task corresponding to the set graphics state may be submitted to a GPU. In one embodiment, the scripting language may initiate a draw call. The scripting language may call functions on a graphics library and directly set the state in the GPU. In response to a draw call, the script may provide the vertices in the draw call to the GPU. When the task is complete, the scripting language may set the next graphics state at 204. In one embodiment, the GPU may report any graphics pipeline errors back to the scripting language.

Selecting the debug mode of FIG. 2 may allow a script programmer to opt-out of the performance mode of FIG. 1 and view validation errors and/or graphics pipeline errors. Providing a default mode that may facilitate high performance graphics yet allow for selecting a debug mode may provide a significant degree of flexibility for script programmers.

Figure 3:
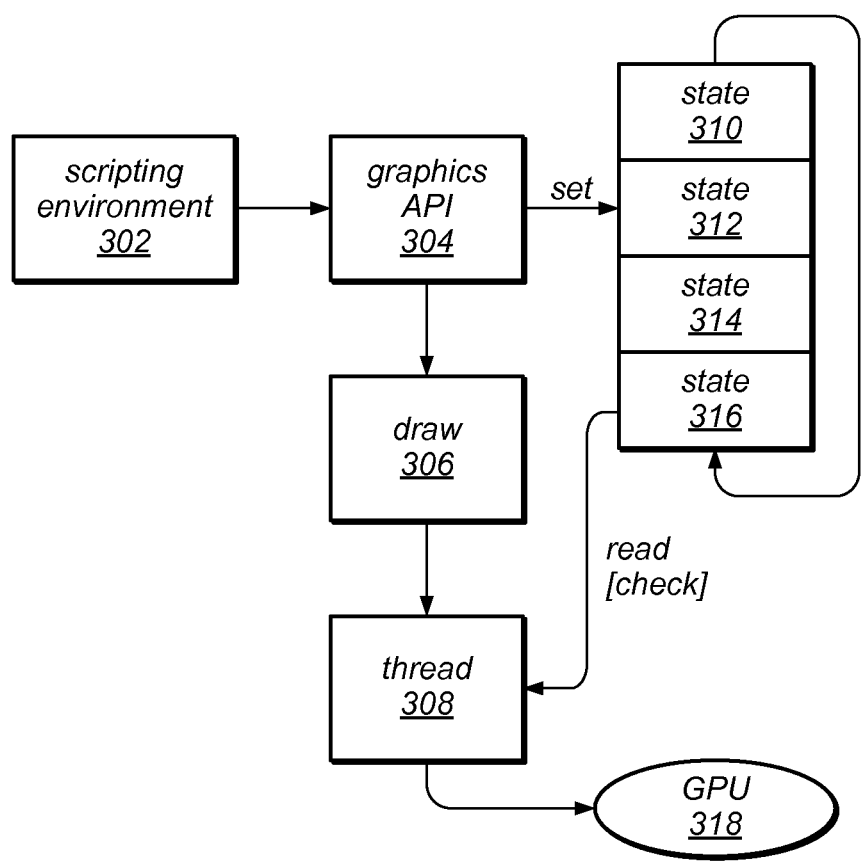
FIG. 3 is a block diagram of a parallelized definition and display of content, according to some embodiments.

FIG. 3 illustrates an example of one embodiment of a parallelized definition and display of content. FIG. 3 shows a scripting environment 302 entering through a graphics application programming interface (API) 304. Scripting environment 302 may be an ActionScript 3, JavaScript, or Microsoft .NET scripting environment, among other scripting environment. The scripting environment may provide a single-threaded programming model. Graphics API 304 may be an entry point for a graphics context. For example, graphics API 304 may be created or initialized at program setup. The graphics API 304 implementation may be known as Context3D. The client-side state may be aggregated and managed by a Context3D object. In one embodiment, upon initialization, a program may be defined and assigned to graphics API 304 to instruct GPU 318 how to process vertices.

In one embodiment, graphics API 304 may set a graphics state. Example graphics states may include: setProgram( ) setProgramConstantsFromVector( ) setProgramConstantsFromMatrix( ) setVertexBufferAt( ) setBlendFactors( ), setColorMask( ), setDepthTest( ) setTextureAt( ) setRenderToTexture( ) setRenderToBackBuffer( ), setCulling( ) setStencilActions( ), setStencilReferenceValue( ), setScissorRectangle( ) etc. As shown in FIG. 3, graphics states may be set in state blocks 310-316 of a state buffer. In the example shown, the state buffer includes 4 elements or blocks. As described above, the buffer may include 4, 8, 16, 32, 64, etc. elements. In one embodiment, the buffer may reside in CPU system memory. As an example of setting a graphics state, an input may be received by graphics API 304 to create a texture object that may be assigned using a setTextureAt call (the "At" portion of a call may refer to previously set portions of the program). The setTextureAt state may be set in one of state blocks 310-316.

In one embodiment, scripting environment 302 may perform a trivial validation of the input received by graphics API 304. For example, scripting language may check for invalid texture size, NULL required parameters, etc. Graphics API 304 may then provide two draw 306 calls that initiate drawing by passing date into the graphics pipeline: clear( ) and drawTriangles( ). Invocations of draw 306 may queue a draw task and allow scripting environment 302 to return to other tasks. Queuing the draw task may include: calculating a list of vertices, storing the vertices in a vertex buffer, and calling setVertexBufferAt. In the above setTextureAt/setVertexBufferAt example, the state may, at this point, include: how to interpret the vertices, textures to apply to the vertices, and the vertices themselves. Thus, scripting environment 302 may be free to return to geometry processing tasks while thread 308 picks up the draw task. Accordingly, thread 308 may be transparent to scripting environment 302 and graphics API 304.

Thread 308 may inspect the state block, states 310-316, and determine which state is new to GPU 318 since the previous inspection. If multiple states are new, for example, states 314 and 316, thread 308 may look for pointers indicating an ordering or priority for processing. Thread 308 may then validate the state 310-316 corresponding to the queued draw task. This may help ensure compatibility between the VertexBuffer definitions and the shader programs that access them. Further, validation of data before delivery to the graphics subsystem may enhance security by making it more difficult to pass arbitrary user data into the graphics subsystem. Validation failure may not trigger an error notification to graphics API 304. In one embodiment, if validation fails, the state 310-316 corresponding to the failed validation may be skipped and never be provided to GPU 318. Instead, the next state in the queue may be checked for validity and proceed if validated. Thread 308 may call functions on the graphics library and provide the new state, state 316 in FIG. 3, to the GPU 318. In response to the draw call, thread 308 may take the vertices that were provided in the draw call and provide them to GPU 318. At that point, GPU 318 may perform the draw task and draw triangles, for example. During validation of the state 310-316, and while thread 308 provides the state to GPU 318, scripting environment 302 and graphics API 304 may continue setting new graphics states in state blocks 310-316. In other words, thread 308 may read one state block 310-316 and, in parallel, graphics API 304 may set a different state block 310-316. A mechanism may prevent the same state block 310-316 from being read/written simultaneously.

Permitting a script programmer to simply update a graphics state while a thread reads the state and applies changes to the GPU may allow threaded behavior in a single-thread scripting environment without using or requiring threading constructs in the scripting language. This may result in significant performance gains. For example, if the scripting language completes its processing quickly and recycles to set additional graphics states, state blocks may be queued and processed sequentially by draw tasks. The existence of a run queue may ensure that the graphics subsystem is not idle waiting for data. And because the scripting language may not block, waiting for error reporting from the draw task, it may continue to set graphics states for later asynchronous processing. As a result, idle time may be minimized at the scripting level and at the GPU level.

Figure 4:
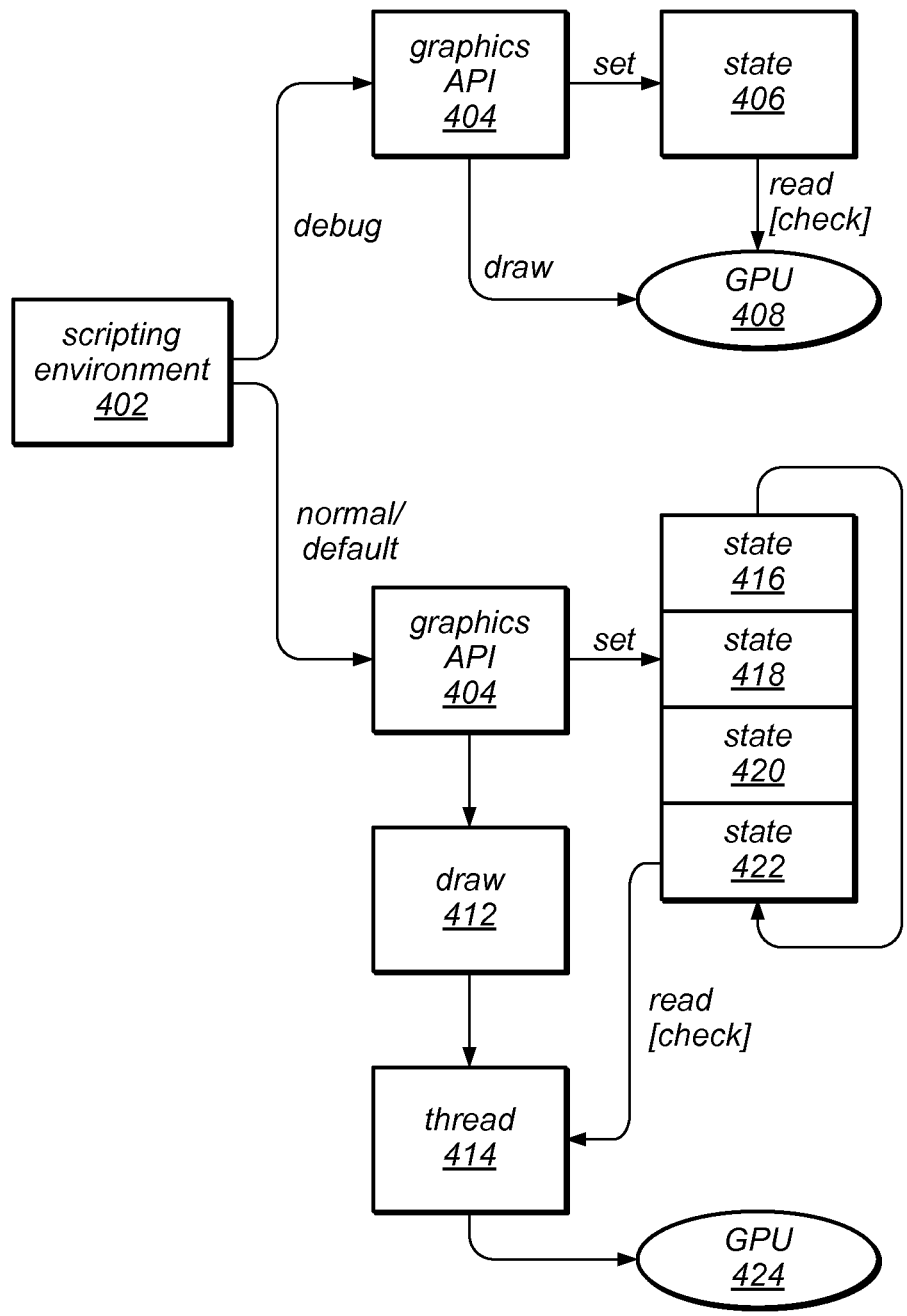
FIG. 4 is a block diagram of a parallelized definition and display of content, according to some embodiments.

FIG. 4 illustrates an example of one embodiment of parallelized definition and display of content. As shown, the bottom portion of FIG. 4 may be a normal/default mode that may operate in a similar fashion to FIG. 3. Debug mode may be selected at the scripting environment 402 level through graphics API 404. For ease of illustration, FIG. 4 shows graphics API 404 in both the upper portion of FIG. 4 (debug mode) and in the lower portion (normal/default mode), when, in one embodiment, it may be the same graphics API 404. In general, the behavior downstream of graphics API 404 may differ between the debug and normal modes. Normal mode is described above, in FIG. 3.

A debug mode may be selected at scripting environment 402/graphics API 404. Graphics API 404, in debug mode, may include a different layout, appearance-wise, and contain different options compared to graphics API 404 in normal mode. As in normal mode, a graphics state may be set in state block 406. Only one state block 406 is shown in the debug portion of FIG. 4, however, the same state blocks 416-422 of the normal mode may be available in the debug mode. Setting and reading the states blocks may be performed sequentially and serially, as opposed to the parallel capabilities of the normal mode. Therefore, in one embodiment, even when multiple state blocks 416-422 are available to write to and read from, graphics API 404 may only write to and read from one of the state blocks 416-422 at a time.

In debug mode, validation may be performed at draw time in GPU 408. Failure to validate the state block 408 may result in an error exception. The error exception may be provided back to scripting environment 402 and graphics API 404. During validation at GPU 408, scripting environment 402 and graphics API 404 may be blocked from setting subsequent graphics states 406 until GPU 408 has finished performing the draw task, or reported an error. Accordingly, in one embodiment, GPU 408 may check for and report any errors to scripting environment 402 before scripting environment 402 may proceed with further operations. In an alternative disclosed embodiment, a framework for managing message sequence IDs may be introduced to detect and report errors. Such a framework may enable asynchronous drawing methods, as in normal/default mode, but also include the capability to check for and report errors.

The aforementioned debug mode may permit drawing methods to be synchronous, which may facilitate error reporting. Additionally, the debug mode may be selectable such that a default mode may permit high performance, and parallelized GPU drawing, yet still allow a programmer debugging capabilities in a low overhead manner.

EXAMPLE SYSTEM

Figure 5:
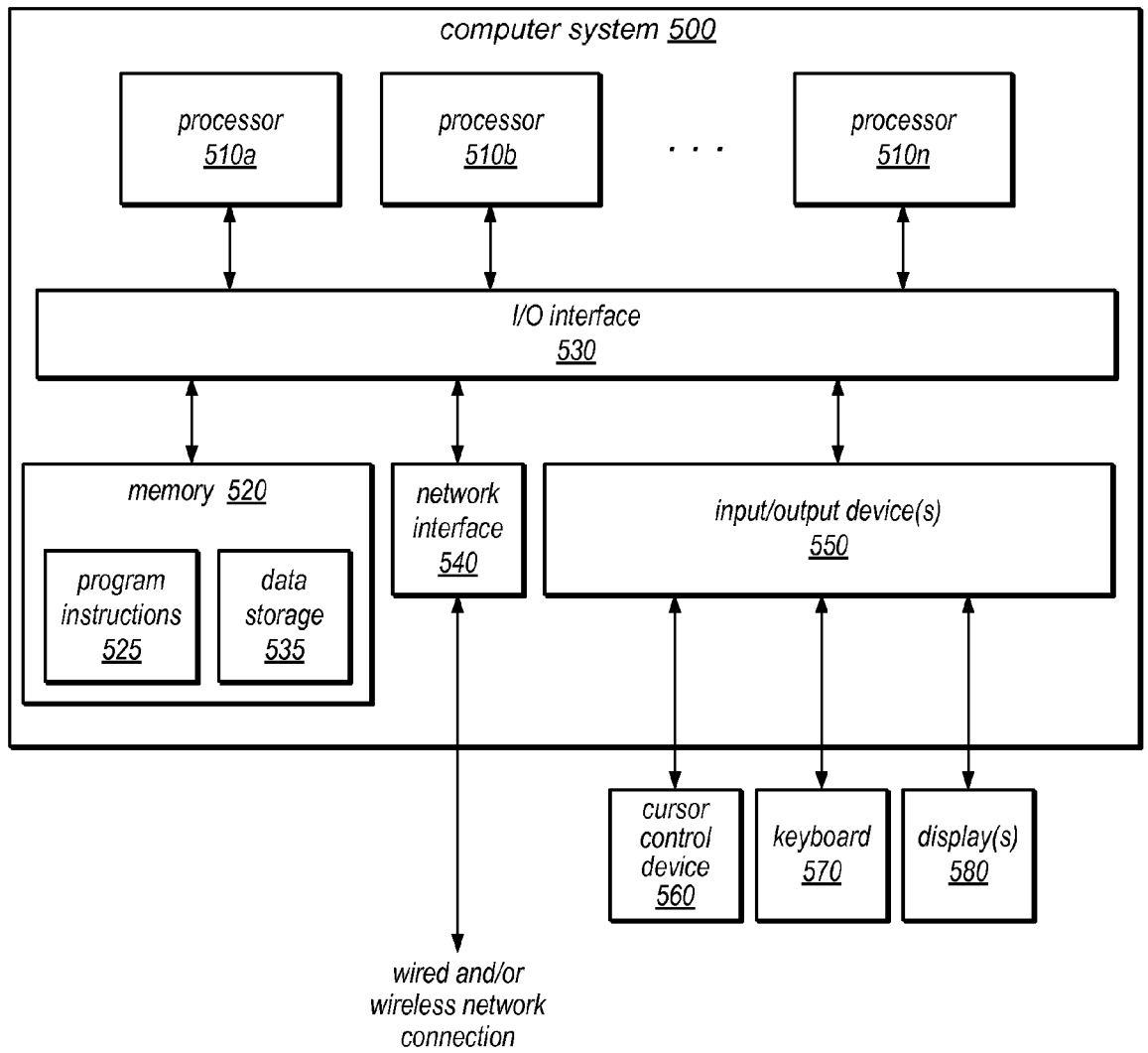
FIG. 5 illustrates an example computer system that may be used in embodiments.

Embodiments of a state setting module, drawing module, and/or the various parallel definition and display of content techniques as described herein may be executed on one or more computer systems, which may interact with various other devices. One such computer system is illustrated by FIG. 5. In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In some embodiments, it is contemplated that embodiments may be implemented using a single instance of computer system 500, while in other embodiments multiple such systems, or multiple nodes making up computer system 500, may be configured to host different portions or instances of embodiments. For example, in one embodiment some elements may be implemented via one or more nodes of computer system 500 that are distinct from those nodes implementing other elements.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

In some embodiments, at least one processor 510 may be a GPU. A GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The processors and/or GPU(s) may implement one or more APIs that permit programmers to invoke the functionality of the GPU(s). Suitable GPUs may be commercially available from vendors such as NVIDIA Corporation, ATI Technologies (AMD), and others.

GPUs, such as one or more of processors 510 may be implemented in a number of different physical forms. For example, GPUs may take the form of a dedicated graphics card, an integrated graphics solution and/or a hybrid solution. The dedicated graphics card may be a 3D graphics card. GPU 510 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 510 and the rest of the computer system 500 may travel through a graphics card slot or other interface, such as I/O interface 530 of FIG. 5.

Note that program instructions 525 may be configured to implement a graphics application as a stand-alone application, or as a module of another graphics application or graphics library, in various embodiments. For example, in one embodiment program instructions 525 may be configured to implement graphics applications such as painting, editing, publishing, photography, games, animation, and/or other applications, and may be configured to provide the functionality described herein. In another embodiment, program instructions 525 may be configured to implement the techniques described herein in one or more functions or modules called by another graphics application executed on GPU 510 and/or processor(s) 510 (e.g., a state setting module or a drawing module). These modules may be executable on one or more of CPUs 510 and/or GPUs 510 to cause computer system 500 to provide the functionality described herein. The graphics application may be implemented in various embodiments using any desired programming language, scripting language, or combination of programming languages and/or scripting languages, e.g., C, C++, C#, ActiveScript, Java™, Perl, etc. For example, in one embodiment, the graphics application may be JAVA based, while in another embodiments, it may be implemented using ActiveScript 3. In other embodiments, the graphics application may be implemented using specific graphic languages specifically for developing programs executed by specialized graphics hardware, such as a GPU. In addition, the graphics application may be embodied on memory specifically allocated for use by graphics processor(s), such as memory on a graphics board including graphics processor(s). Program instructions 525 may also be configured to render images and present them on one or more displays as the output of an operation and/or to store image data in memory 520 and/or an external storage device(s), in various embodiments.

System memory 520 may be configured to store program instructions and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a state setting module and drawing module are shown stored within system memory 520 as program instructions 525 and data storage 535, respectively. In other embodiments, program instructions and/or data may be received, sent or stored upon different types of computer-accessible media or on similar media separate from system memory 520 or computer system 500. Generally speaking, a computer-accessible medium may include storage media or memory media such as magnetic or optical media, e.g., disk or CD/DVD-ROM coupled to computer system 500 via I/O interface 530. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 540.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments some or all of the functionality of I/O interface 530, such as an interface to system memory 520, may be incorporated directly into processor 510.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or retrieving data by one or more computer system 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

As shown in FIG. 5, memory 520 may include program instructions 525, configured to implement embodiments of a state setting module and drawing module as described herein, and data storage 535, comprising various data accessible by program instructions 525. In one embodiment, program instructions 525 may include software elements of embodiments of a state setting module and drawing module as illustrated in the above Figures. Data storage 535 may include data that may be used in embodiments. In other embodiments, other or different software elements and data may be included.

Those skilled in the art will appreciate that computer system 500 is merely illustrative and is not intended to limit the scope of a state setting module and drawing module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
    setting, by a scripting thread, a graphics state by at least storing the graphics state in a first block of a buffer;
    determining a validity of the graphics state without error checking by at least comparing data of the graphics state to expected data of the graphics state;
    submitting, by a worker thread after said determining the validity, a task corresponding to the graphics state to a graphics processing unit (GPU); and
    without waiting for an indication of successful completion of the task by the GPU, setting an additional graphics state by at least storing the additional graphics state in a second block of the buffer, the worker thread being configured to read the graphics state from the first block of the buffer in parallel with the storing of the additional graphics state in the second block of the buffer by the scripting thread.

2. The method of claim 1, wherein the scripting thread and the worker thread are configured to execute within a scripting environment.

3. The method of claim 1, wherein said determining the validity of the graphics state includes reading from the buffer, wherein the buffer is configured to be read from and stored to simultaneously in different blocks of the buffer.

4. The method of claim 3, wherein the buffer resides in a central processing unit (CPU) executing the scripting environment.

5. The method of claim 1, wherein said determining the validity of the graphics state includes:
    reading data of the graphics state;
    determining that the data of the graphics state is different than the expected data of the graphics state resulting in a failed validity check; and
    skipping submission of the task corresponding to the graphics state to the GPU.

6. The method of claim 5, wherein skipping submission of the task includes without reporting the failed validity check, reading the additional graphics state by the worker thread.

7. The method of claim 1, wherein the scripting thread and the worker thread are configured to execute in a scripting environment, wherein the scripting environment provides a single-threaded programming model.

8. The method of claim 1, wherein the graphics state is a definition for a display of 3D content.

9. The method of claim 1, wherein the scripting thread and the worker thread are configured to execute in a scripting environment, and further comprising:
    receiving input to enter a debug mode to block an attempt to set subsequent graphics states until an error is received or the task corresponding to the graphics state is complete;
    determining that the graphics state is invalid;
    reporting an error indicating that the graphics state is invalid; and
    setting a next graphics state.

10. The method of claim 9, further comprising in the scripting environment:
    determining that the next graphics state is valid;
    submitting a task corresponding to the next graphics state to the GPU;
    waiting for an indication of successful completion of the task corresponding to the next graphics state by the GPU; and
    setting another next graphics state.

11. A computer-readable storage device storing program instructions that, responsive to execution by a computing device, cause the computing device to perform a method, the method comprising:
    setting a graphics state by a first thread of a scripting environment by at least storing the graphics state in a first block of a buffer;
    determining a validity of the graphics state by at least comparing data of the graphics state to expected data of the graphics state, the validity being determined without error checking;

submitting, by a second thread of the scripting environment after said determining the validity, a task corresponding to the graphics state to a graphics processing unit (GPU); and without waiting for an indication of successful completion of the task by the GPU, setting an additional graphics state by at least storing the additional graphics state in a second block of the buffer, the second thread configured to read from the first block of the buffer in parallel with the storing of the additional graphics state in the second block of the buffer by the first thread.

12. The computer-readable storage device of claim 11, wherein said determining the validity of the graphics state is performed by a worker thread of the scripting environment.

13. The computer-readable storage device of claim 12, wherein said setting the graphics state includes storing the graphics state in the buffer, wherein said determining the validity of the graphics state includes reading from the buffer, wherein the buffer is configured to be read from and stored to simultaneously in different blocks of the buffer.

14. The computer-readable storage device of claim 12, wherein said determining the validity of the set graphics state includes:
reading data of the graphics state;
determining the data of the graphics state is different than the expected data of the graphics state resulting in a failed validity check; and
skipping submission of the task corresponding to the graphics state to the GPU.

15. The computer-readable storage device of claim 14, wherein said skipping submission of the task comprises reading, without reporting the failed validity check, another graphics state by the worker thread.

16. The computer-readable storage device of claim 11, wherein the program instructions are executable to cause the computing device to perform a method further comprising:
receiving input to enter a debug mode and block one or more attempts to set subsequent graphics states until an error is received or the task corresponding to the graphics state is complete;
determining the graphics state is invalid;
reporting an error indicating that the graphics state is invalid; and
setting a next graphics state.

17. The computer-readable storage device of claim 16, wherein the program instructions are further executable to cause the computing device to perform a method further comprising:
determining the next graphics state is valid;
submitting a task corresponding to the next graphics state to the GPU;
waiting for indication of successful completion of the task corresponding to the next graphics state by the GPU; and
setting another next graphics state.

18. A system, comprising:
at least one processor; and
a memory comprising program instructions that are executable by the at least one processor to:
set, by a scripting thread of a scripting environment, a graphics state by at least storing the graphics state in a first block of a buffer;
determine a validity of the graphics state by a worker thread of the scripting environment, the validity being determined without error checking and by at least comparing data of the graphics state to expected data of the graphics state;
submit a task corresponding to the graphics state to a graphics processing unit (GPU); and
set an additional graphics state without waiting for an indication of successful completion of the task by the GPU by at least storing the additional graphics state in a second block of the buffer, the worker thread configured to read the graphics state from the first block in parallel with the storing of the additional graphics state in the second block of the buffer by the scripting thread.

19. The system of claim 18, wherein the program instructions are further executable by the at least one processor to store the graphics state in a buffer of the at least one processor and read the graphics state from the buffer, wherein the buffer is configured to be read from and stored to simultaneously in different elements of the buffer.

20. The system of claim 19, wherein the validity of the graphics state is determined by at least:
reading data of the graphics state from the buffer;
determining the data of the graphics state is different than the expected data of the graphics state resulting in a failed validity check; and
skipping submission of the task corresponding to the graphics state to the GPU.

21. The system of claim 18, wherein the program instructions are further computer executable by the at least one processor to:
receive input to enter a debug mode and block an attempt to set subsequent graphics states until an error is received or the task corresponding to the graphics state is complete;
determine the graphics state is invalid;
report an error indicating that the graphics state is invalid; and
set a next graphics state.

* * * * *